No. 821,297. PATENTED MAY 22, 1906.
D. S. KOHLER.
BOLT RETAINING DEVICE.
APPLICATION FILED JULY 28, 1905.

2 SHEETS—SHEET 1.

WITNESSES
INVENTOR
David S. Kohler

No. 821,297. PATENTED MAY 22, 1906.
D. S. KOHLER.
BOLT RETAINING DEVICE.
APPLICATION FILED JULY 28, 1905.
2 SHEETS—SHEET 2.
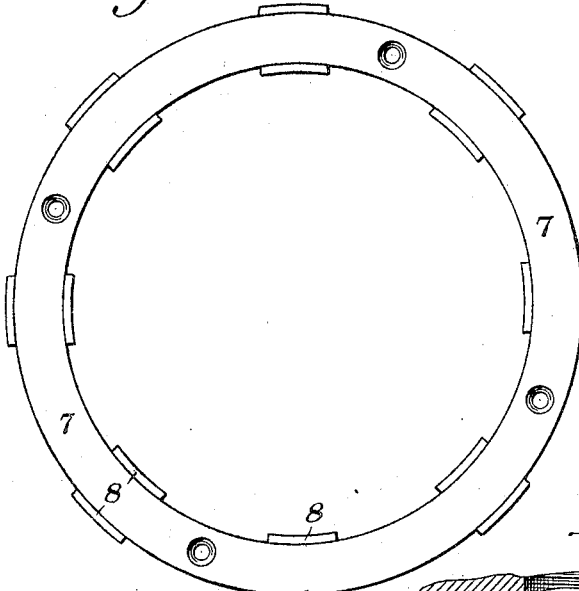
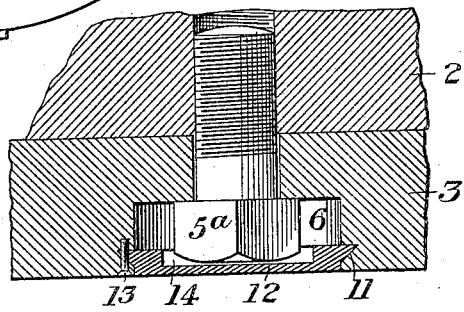
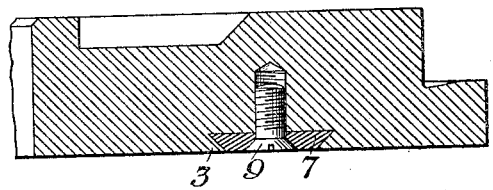
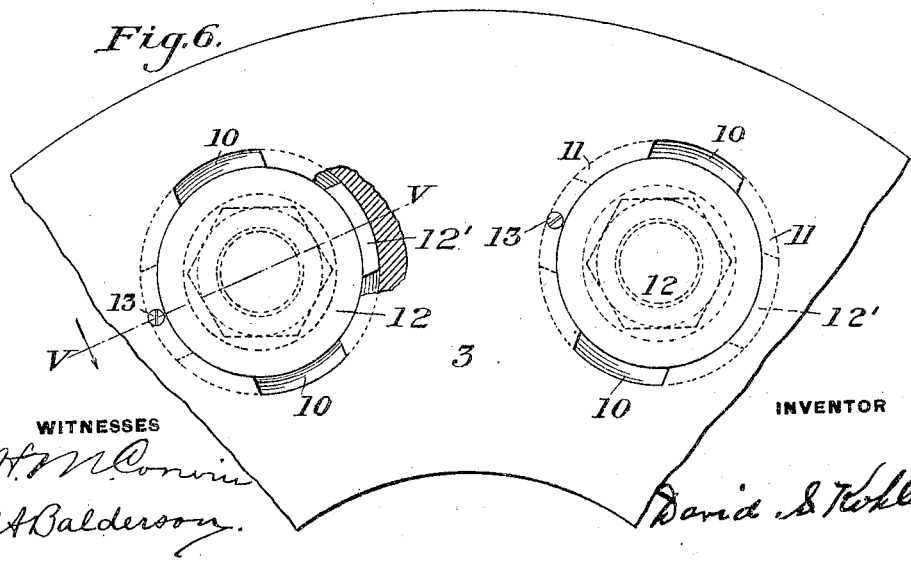
WITNESSES
INVENTOR

UNITED STATES PATENT OFFICE.

DAVID S. KOHLER, OF PITTSBURG, PENNSYLVANIA.

BOLT-RETAINING DEVICE.

No. 821,297.　　　　Specification of Letters Patent.　　　　Patented May 22, 1906.

Application filed July 28, 1905. Serial No. 271,566.

*To all whom it may concern:*

Be it known that I, DAVID S. KOHLER, of Pittsburg, Allegheny county, Pennsylvania, have invented a new and useful Bolt-Retaining Device, of which the following is a full, clear, and exact description, reference being had to the accompanying drawings, forming part of this specification, in which—

Figure 1:
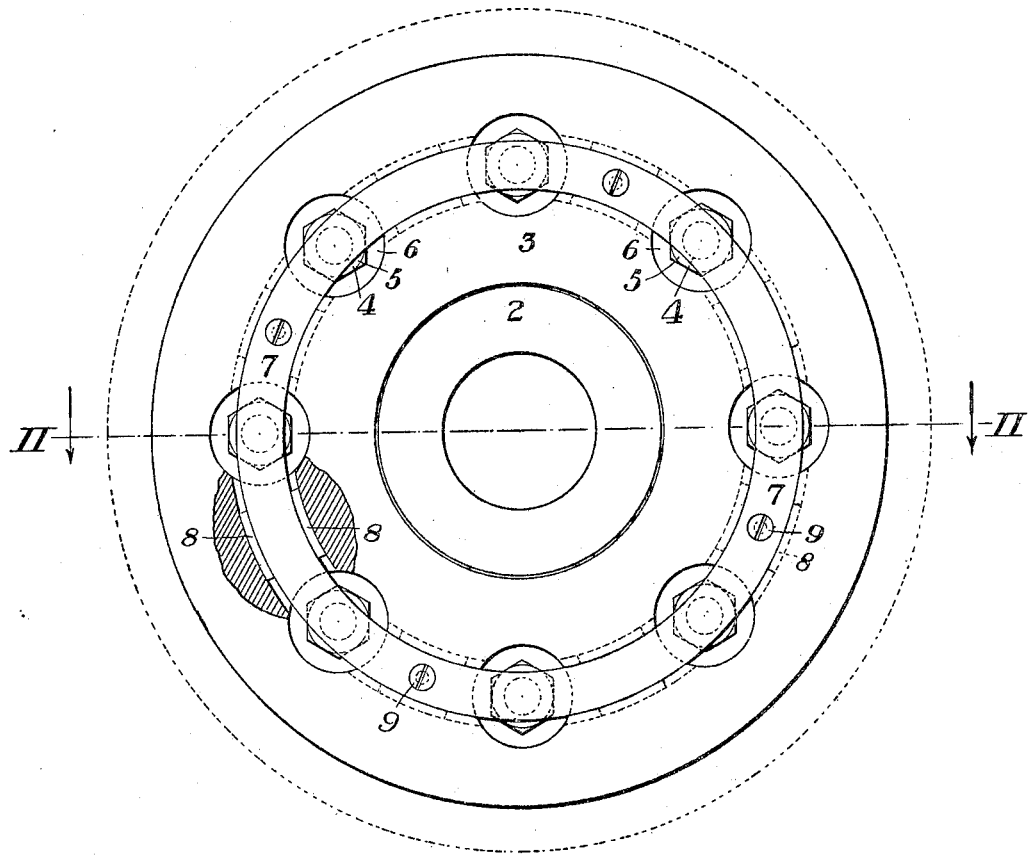
Figure 2:
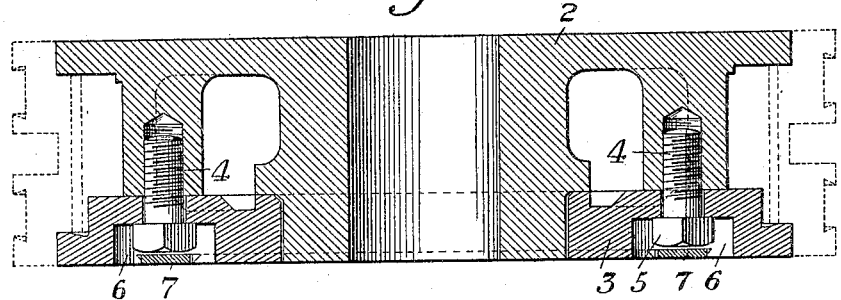

Figure 1 is a front elevation, partly broken away, of a piston provided with my improved attachment. Fig. 2 is a central cross-section of the same. Fig. 3 is a plan view of the retaining-ring. Fig. 4 is an enlarged detail view. Fig. 5 is a detail view of a modified form, and Fig. 6 is a partial plan view of the form of Fig. 5.

My invention relates to the retaining in position of nuts, screws, or bolts, particularly those set in recesses of the part or parts to be joined; and the object of the invention is to prevent loosening and falling out of the parts by means of a simple and effective retainer.

The invention is especially applicable to the retaining of tap bolts or screws in pistons of steam-engines or other motors, where the jarring loose or breaking of the screw or bolt frequently causes a breakdown or other injury. The invention is, however, applicable generally, and I do not wish to restrict my broader claims to the use of the device in connection with pistons or plungers.

In the drawings, referring to the form of Figs. 1 to 4, inclusive, 2 represents a piston having the usual follower-ring 3 for retaining the packing ring or rings. This follower-ring is held by tap-screws 4 or stud-bolts, the heads 5 of which are seated within circular recesses 6 in the follower-ring. The above parts represent the ordinary construction. In carrying out my invention with such a piston I preferably form arc-shaped undercut grooves between the circular recesses and then provide the ring or steel annulus 7. (Shown in Fig. 3.) This ring is provided with separated pairs of beveled lips or flanges 8 8, which are spaced apart a distance corresponding to the distance between the circular recesses or pockets for the heads of tap-screws. They are also of proper size and shape to fit the undercut grooves between these recesses.

In applying the ring it is laid on the follower-ring with the flanges 8 in registry with the holes 6. It is then pushed forward into place and turned until the flanges 8 engage the undercut grooves or recesses in the manner shown in Fig. 1. In order to prevent the turning or working loose of the ring after it has been properly positioned, I hold it in any suitable manner. For this purpose I have shown small screws 9 extending through the retaining-ring into the follower-ring. It may, however, be retained by jamming a portion thereof with a hammer or chisel or any other desirable manner.

In the operation of the device when the tap-screws begin to work out under the jarring in practice the retaining-ring holds them in place and prevents their loosening and dropping out. It thereby avoids the injury or destruction of the motor, which occurs when such a screw drops out of place. Instead of providing an annular groove and a complete ring I may provide each pocket or circular recess 6 with a separate retainer. Thus in Figs. 5 and 6 I show each hole as provided with opposite cut-out portions 10, between which the wall of the hole is undercut at 11. In this case the retainer 12 is made circular in form to fill the recess 6 and is provided with beveled ends or lugs 12' and is dropped into place through the cut-out parts 10 and then turned so that its ends or lugs will engage the undercuts. They may then be held by a small screw 13. In this case I have shown the circular retaining-plate as recessed at 14 to receive the head 5ª of the tap-screw. It is obvious that instead of the bolts being arranged in circular relation, as shown, they may be in alinement and locked in place by a straight bar or bars, provided with flanges.

The advantages of my invention will be apparent to those skilled in the art. The injury and delays incident to the working out of the tap-screws, bolts, or nuts is avoided, while the device is simple, cheap, and easily applied. It is of especial value in locations which are not in sight of the operator.

Many other variations may be made in the form and arrangement of the retaining bar or plate and the means for preventing turning thereof without departing from my invention.

I claim—

1. An element having a recess or pocket, a screw, stud or bolt, having a head or nut in the recess or pocket, and a retaining bar or strip arranged to be held in position over the recess or pocket by a partial rotation in either direction; substantially as described.

2. An element having a pocket with a nut, stud or bolt therein, and a retaining-bar arranged to be held by a partial rotation turning it into position over the pocket; substantially as described.

3. An element having a pocket with a nut, stud or bolt therein, a retaining-bar arranged to be held by a partial rotation turning it into position over the pocket, and means for holding the retainer in its turned position; substantially as described.

4. An element having a pocket or recess, and a retaining-plate held by its edges engaging undercut grooves in the element; substantially as described.

5. An element having a series of pockets or recesses, and a retaining-plate having edge portions held in retaining-grooves between the pockets; substantially as described.

6. An element having a series of pockets or recesses, a retaining-plate having edge portions held in undercut grooves between the pockets, and means for preventing movement of the retaining bar or plate; substantially as described.

7. A follower-ring having a circular row of pockets with arc-shaped grooves between them, and a retaining-ring held by lips within the grooves; substantially as described.

In testimony whereof I have hereunto set my hand.

DAVID S. KOHLER.

Witnesses:
J. M. GRAVES,
H. M. CORWIN.